J. HERMANN.
BOTTLE SEALING MECHANISM.
APPLICATION FILED MAY 31, 1907.
949,678.
Patented Feb. 15, 1910.
4 SHEETS—SHEET 1.
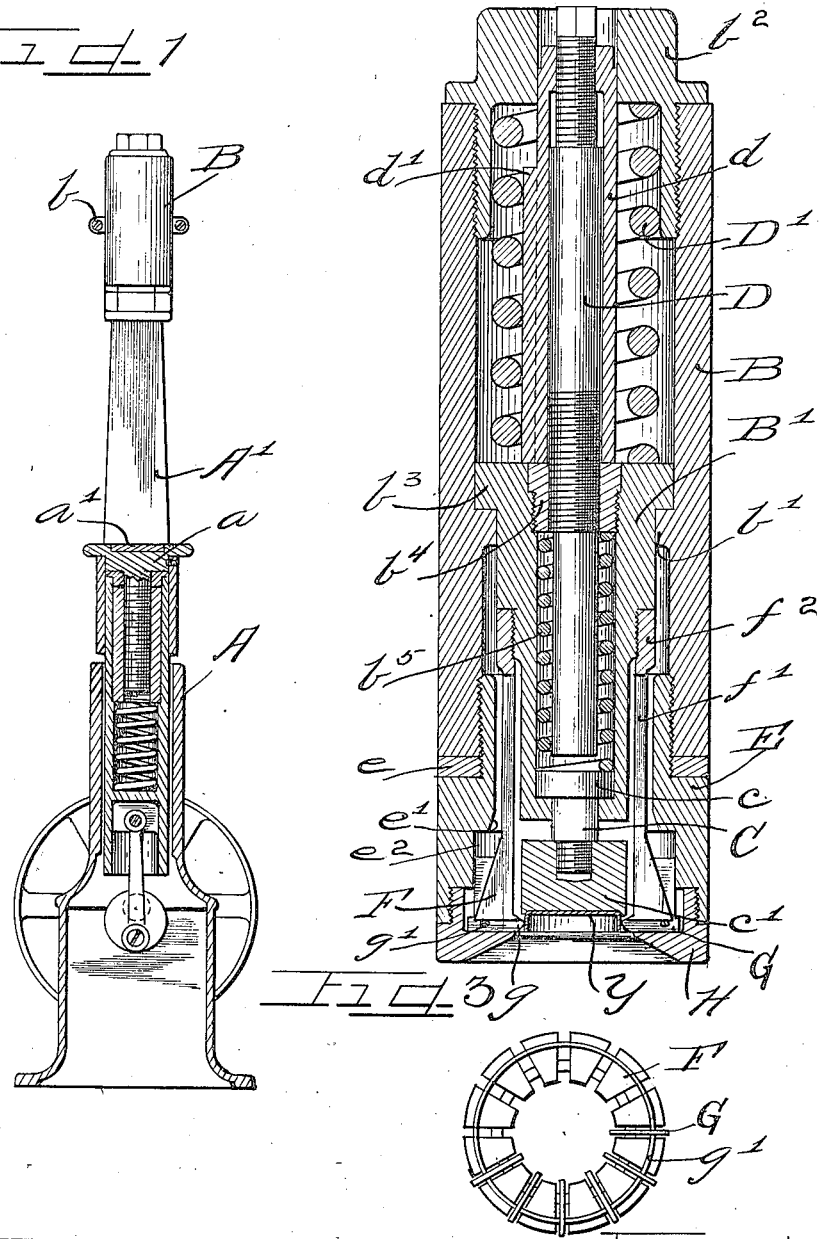
Witnesses
J. W. Angell
Inventor
Jacob Hermann
by Charles W. Tice Atty.

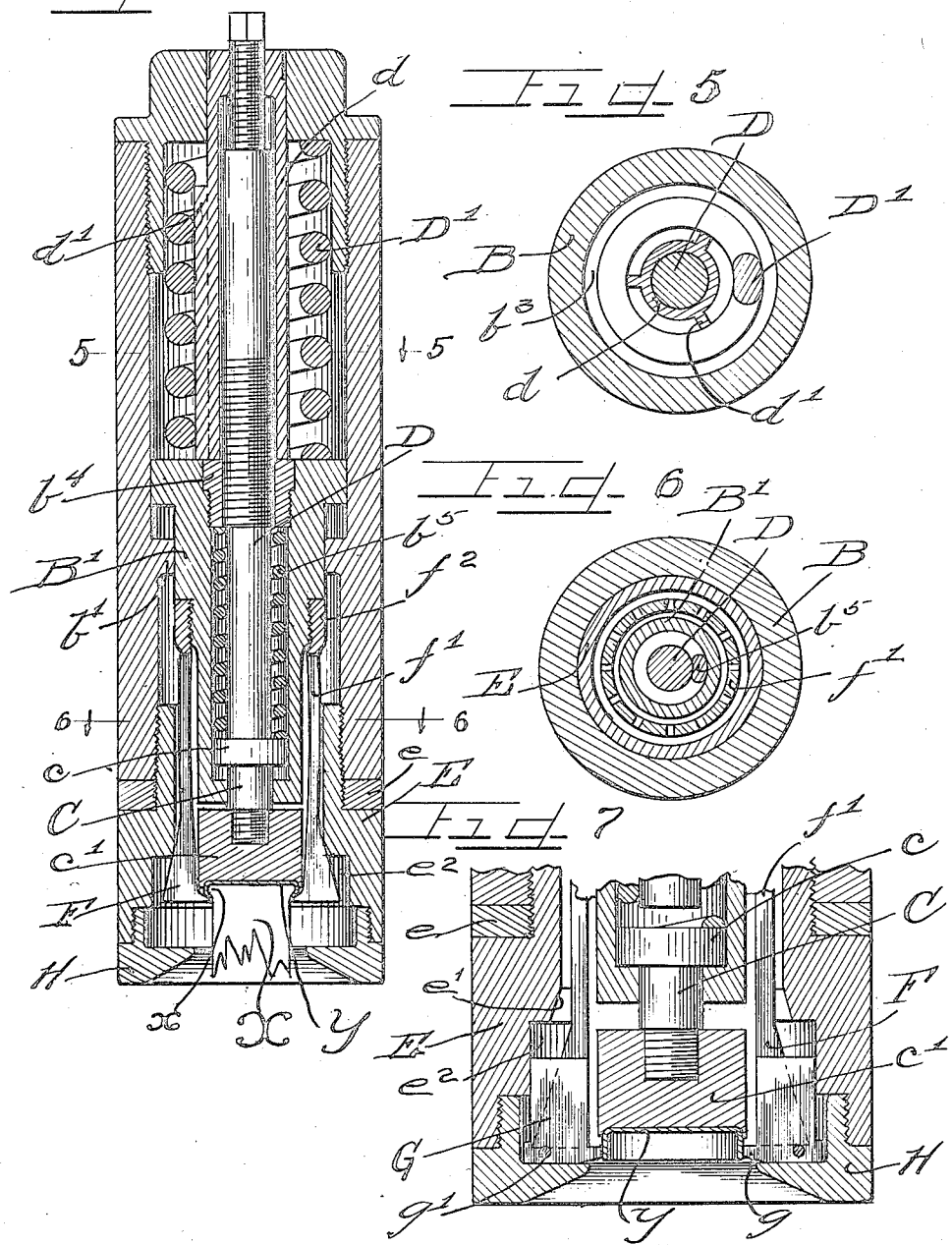

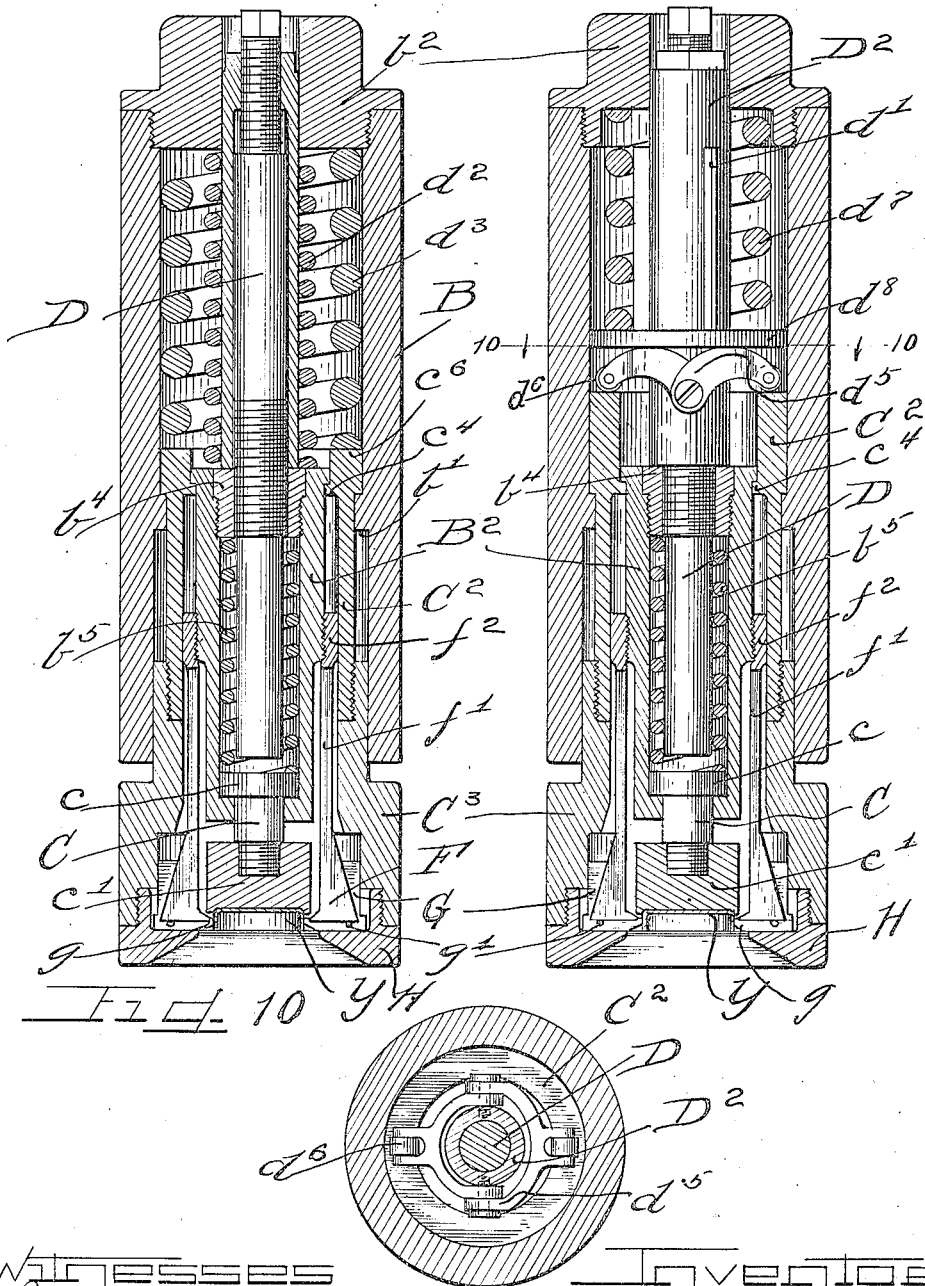

J. HERMANN.
BOTTLE SEALING MECHANISM.
APPLICATION FILED MAY 31, 1907.
949,678.
Patented Feb. 15, 1910.
4 SHEETS—SHEET 4.
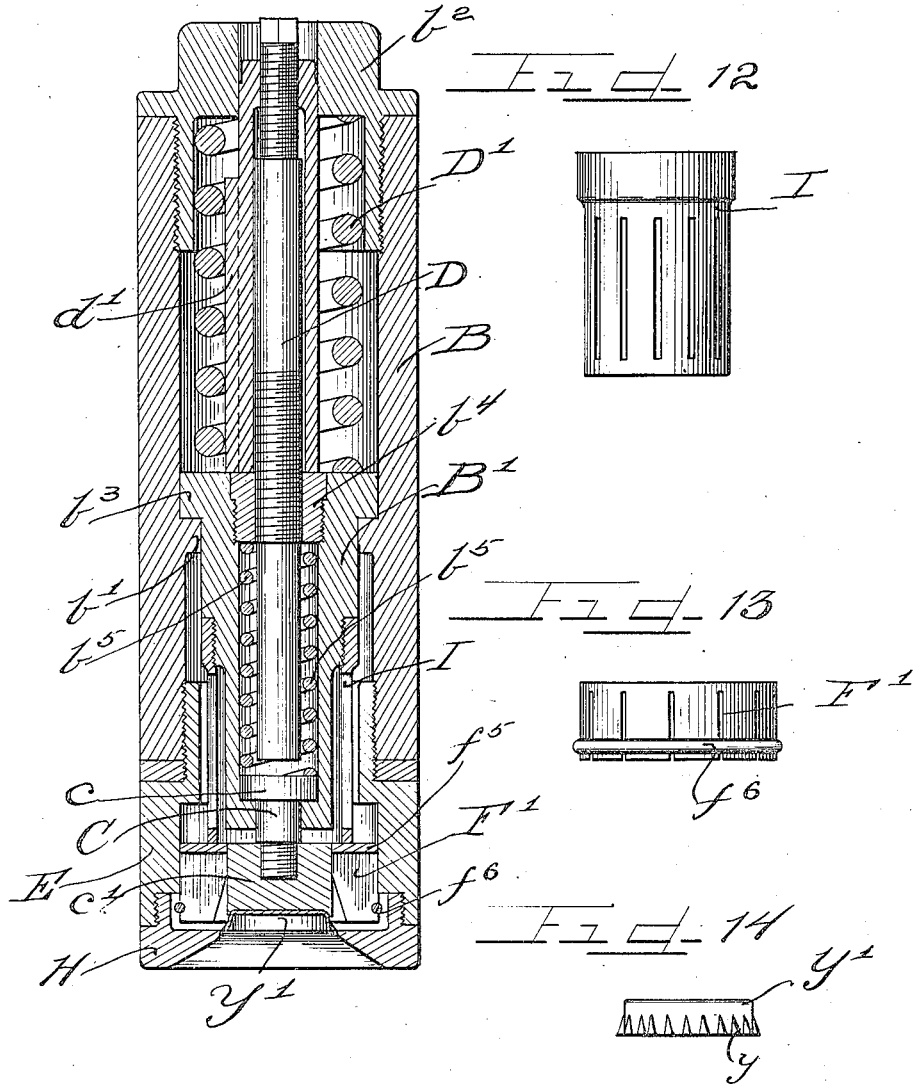

UNITED STATES PATENT OFFICE.

JACOB HERMANN, OF CHICAGO, ILLINOIS, ASSIGNOR TO THE CHAMPION SANITARY BOTTLE SEAL COMPANY, A CORPORATION OF OHIO.

BOTTLE-SEALING MECHANISM.

949,678.

Specification of Letters Patent.

Patented Feb. 15, 1910.

Application filed May 31, 1907. Serial No. 376,577.

*To all whom it may concern:*

Be it known that I, JACOB HERMANN, a citizen of the United States, and a resident of the city of Chicago, in the county of Cook and State of Illinois, have invented certain new and useful Improvements in Bottle-Sealing Mechanism; and I do hereby declare that the following is a full, clear, and exact description of the same, reference being had to the accompanying drawings, and to the letters of reference marked thereon, which form a part of this specification.

Heretofore in applying metallic seals to bottles, the variations in the height of the bottle frequently caused breakage and loss when sealing and the varieties in surface and contour of the bottle necks often make it difficult if not impossible to mechanically secure a metallic seal thereon to prevent leakage. A large percentage of the bottles so sealed necessarily require resealing thereby incurring loss of time and considerable expense owing to the destruction of the seals imperfectly applied. Frequently also the sealing caps are not uniform in shape and the holding means heretofore employed for the purpose of retaining the caps in place until the bottle is positioned to receive the same, have proven inadequate to properly support the seal to register with and cover the orifice of the bottle.

The object of this invention is to provide a bottle sealing machine embracing a chuck which by means of the pressure applied to the cap in sealing the bottle may be graduated for different sizes or lengths of bottles and in which the mechanism is capable of exerting great pressure in sealing but so uniformly as to prevent breakage.

It is a further object of the invention to provide a chuck adapted automatically to close the flanges of the seal or cap beneath the bead on the bottle neck, and which is so constructed that the pressure applied thereby to and beneath the bead is distributed approximately equally around the neck of the bottle independently of any slight variations in contour.

It is a further object of the invention in connection with a chuck of the class described to provide retaining means for the sealing cap, whereby the cap, though not quite uniform in shape is yieldingly but positively engaged and supported in the chuck until the bottle is inserted and the sealing cap pressed thereon to close the orifice.

Finally it is an object of my invention to provide a device of the class described of great strength and durability though of the utmost simplicity, capable of operation at a wide range of speed and by the use of which imperfect sealing is obviated and breakage of bottles rendered well nigh impossible.

The invention consists in the matters hereinafter described and more fully pointed out and defined in the appended claims.

On the drawings: Figure 1 is a front elevation partly in vertical section of a sealing machine provided with a device embodying my invention. Fig. 2 is an enlarged vertical section of the chuck showing a sealing cap engaged therein preparatory to application to the bottle. Fig. 3 is a bottom plan view of the closing means and the means for retaining the sealing cup in the chuck. Fig. 4 is a view similar to Fig. 3 but showing the parts in position assumed when applying the seal. Fig. 5 is a section on line 5—5 of Fig. 4. Fig. 6 is a section on line 6—6 of Fig. 4. Fig. 7 is an enlarged fragmentary detail showing the chuck in vertical section with a sealing cap therein. Fig. 8 is a section similar to Fig. 2 but illustrating a slightly modified construction. Fig. 9 is a similar section illustrating a slight modification of the tension for the chuck. Fig. 10 is a section taken on line 10—10 of Fig. 9. Fig. 11 is a section similar to Fig. 2 showing a slight modification of the latter closing jaws. Fig. 12 is a side elevation of the slotted resilient thrust collar. Fig. 13 is a similar view of the chuck. Fig. 14 is a side elevation of the sealing cap adapted to be applied by the chuck shown in Figs. 11, 12 and 13.

As shown in the drawings: A indicates as a whole a bottle sealing machine having the usual or any suitable resiliently supported vertically reciprocating table $a$ on which is secured a pad $a'$ of rubber on which the bottles rest in sealing. Extending upwardly at the rear of the bed is a standard A', on the upper end of which is rigidly secured the mechanisms embodying my invention. Said device as shown embraces an outer tubular sleeve or casing B internally threaded in both ends and provided in its interior near its middle with a central peripheral rib $b'$. Said casing as shown is rigidly secured to the standard $A'$ by means of bolts extending through lugs $b$ which support the same vertically directly above the reciprocating bed $a$ of the machine. Closing the upper end of said casing except for an axial aperture therethrough is a nut $b^2$ which is threaded within the casing and slidable in said casing is a plunger $B'$ provided at its upper end with a flange $b^3$ which fits within the chamber of the casing above the rib $b'$ and on its under side fits to said rib when at its lowest position. Said plunger extends at its lower end somewhat below the end of the casing B and is reduced in diameter and is provided with an axial bore through the lower end thereof. Said plunger above the lower end is cored at a larger diameter than the diameter of said aperture through the lower end and supported in said larger bore is an enlarged head $c$ of a die stem C, which extends through the bore in the lower end of the plunger and on the extremity of which is threaded the closing die $c'$ which acts to hold the sealing cap firmly but somewhat yieldingly against the upward pressure of the bottle. Said stem is of a length to support the closing die $c'$ somewhat below the lower end of the plunger and seated in the upper end of said plunger to close the bore therein is a tubular internally threaded nut $b^4$. A spiral spring $b^5$ is seated in the chamber thus provided in the plunger, the upper end of which engages the nut $b^4$ and the lower end of which is engaged on said die supporting stem. Threaded through said nut $b^4$, and extending through the spring $b^5$ to near the head of the stem C is an adjusting rod D. The upper end of said adjusting rod is angular for engagement with a suitable wrench and is also threaded near its upper end for engagement with a jam nut $d$ which is threaded thereon and bears on the nut $b^4$. Bearing on the upper end of the plunger $B'$ and against the nut $b^2$ is a strong spiral spring $D'$ within which fit ribs $d'$ on the sleeve $d$ which form a spider.

Threaded in the lower end of the casing is a tubular chuck head E on the thread of which between the same and the casing is engaged a jam nut $e$. Said head extends somewhat below the closing die $c'$. The bore therein below its middle is considerably enlarged and said enlarged bore at its inner end is tapered upwardly as shown at $e'$, to actuate the lower closing jaws F which act to close the flange of the seal beneath the bead on the bottle neck. Below said tapered portion as shown at $e^2$ the bore is of large diameter to receive the holding jaws, and at the lower extremity of the chuck head the bore is still more enlarged and internally threaded. Threaded therein is a centering guide H which comprises a head of a diameter approximately equal to the diameter of said casing. Said centering guide is provided with a central upwardly tapering aperture but slightly larger than the diameter of the closing die and which acts to guide the bottle neck into position to receive the sealing cap.

As shown in Figs. 2 to 9 inclusive said closing jaws F are closely arranged around the closing die $c'$ and are shaped to afford relatively straight interior sides or faces and below the closing die, extending inwardly to engage the flange of the cap and close the same below the bead. Said closing jaws are relatively broad at the bottom and on the outer sides taper upwardly complementally with the tapered portion of the bore in the chuck head so that as the jaws move upwardly they are forced simultaneously inward to close the flange. Each of said jaws as shown is integrally connected by means of a relatively thin resilient blade or rod $f'$ of metal provided in alinement with its inner face with an internally threaded collar $f^2$ which threads on said plunger $B'$ so that the closing jaws move upwardly therewith to closing position as pressure is applied from below on the closing die and sealing cap.

Means are provided for yieldingly engaging a sealing cap Y or $Y'$ between the closing jaws, in position to receive and close the neck of the bottle when inserted. For this purpose as shown, a holding jaw is provided consisting of relatively thin plates of metal G of a width to fit within the bore $e^2$ in the lower end of the chuck head and each having an inwardly directed tooth $g'$ thereon, are engaged between the jaws F as shown in Figs. 3 and 7 yieldingly held to exert a slight inward pressure by means of an annular spring $g'$ which extends through an aperture in each plate below the closing jaws.

In some instances it may be desirable as for instance when there is considerable variation in the necks of the bottles that the chuck head should yield upwardly when approximately the sealing pressure is obtained upon the closing die and closing jaws. For this purpose as shown in Figs. 8 and 9 the construction is as before described with the exception that the plunger $B^2$, corresponding with the plunger $B'$, is slidably engaged in a sleeve $C^2$, and normally supported on a rib $c^4$ in the upper end thereof. Said sleeve $C^2$ is supported at its flanged upper end $c^6$ on the rib $b'$ of the casing and is threaded externally at its lower end for engagement with the internally threaded end of the chuck head $C^3$. In the construction shown in Fig. 8 the spring $d^2$ presses upon the upper end of the plunger, and a stronger spring $d^3$ bears on the sleeve $C^2$.

The construction shown in Fig. 9 is substantially that shown in Fig. 8 with the exception that a single spring $d^7$ is used to resist the upward movement of the plunger and chuck head.

As shown the sleeve jam nut $D^2$ on the adjusting rod is of somewhat larger diameter and pivotally engaged thereon at a point to bear at their outer ends on the elongated upper end of the sleeve $C^2$ which carries the chuck head, are levers which have yoked inner ends $d^5$ to engage on each side of said sleeved jam nut. Each at its outer end is provided with an anti-friction roller $d^6$ which presses upon the upper end of the sleeve $C^2$. Said levers as shown are curved upwardly intermediate their ends and resting upon the upwardly curved surface of each is a washer $d^8$ upon which presses a strong spiral spring $d^7$.

The construction shown in Fig. 11 is adapted more particularly to engage a sealing cap $Y'$ having a crimped flange $y$ in place. The construction in general is that illustrated in Fig. 2 except that the laterally movable closing jaws F are omitted and the closing jaws $F'$ are used. These are relatively short at their upper end, fitting closely to the closing die and taper outwardly and downwardly therefrom on the inner side and are integrally connected at their upper ends as shown in Figs. 11 and 13 affording at said upper ends a relatively broad bearing $f^5$. The lower end of a longitudinally slotted resilient thrust collar or sleeve I bears on the top of said jaws and at its upper end is threaded on the plunger as before described with reference to the collar $f^2$. As shown, said closing jaws are engaged peripherally by a band of metal $f^6$ which acts to hold the same from expanding.

The operation is as follows: The chuck having been adjusted to resist the pressure necessary to sufficiently seal the bottle, the filled bottle is placed on the resilient pad $a'$, and as the table moves upwardly the neck of the bottle engages in the cap Y, previously engaged between the holding jaw and an upward pressure is exerted on the closing die. The upward pressure from the table forces the mouth of the bottle firmly into the cap and the continued upward pressure carries the closing die upwardly against the pressure of the spring $b^5$ until the head $c$ of the die stem contacts with the adjusting rod D. Inasmuch as the adjusting rod is rigidly engaged with the plunger $B'$, continued upward pressure forces the plunger upward compressing the spring $D'$ and at maximum closing pressure the inclined outer faces of the closing jaws F are engaged in the tapering bore of the chuck head as shown in Fig. 4 forcing the jaws inwardly to engage and bend the flange on the sealing cap inwardly beneath the bead $x$. The closing jaws are self adjusting to the bottle necks and the cap flanges compensate for any slight variations in the neck of the bottle, because of the resiliency of the rods $f'$. The resiliency of said rods and the manner of engagement of the tapered sides of the jaws with the inclined or tapered bore of the chuck head, tend to produce a yielding and self adjusting inward pressure on the bottle neck, some of said jaws being obviously capable of inclining inwardly more than the others, should the contour of the bottle neck permit. With the descent of the table the springs instantly act to force the plunger and closing die downwardly and the bottle neck from the chuck, whereupon another sealing cap may be quickly inserted between the holding jaws preparatory to receiving and sealing the next bottle.

In the construction illustrated in Figs. 8 to 10 the upward pressure on the closing die having attained nearly the maximum, the inclined faces of the closing jaws engage in the taper in the chuck head and should the bottle neck be somewhat larger than the average, the head carrying the closing jaws therewith may yield upwardly against the action of the springs thus relieving to a certain extent the pressure from the closing jaws to avoid breaking the bottle.

In the construction shown in Figs. 11 to 13 inclusive the crimped sealing cap $Y'$ may be engaged in place by means of the closing jaws $F'$ which when the bottle and seal are pressed therethrough engage the outwardly directed sides $y$ and spring the margin of the flange beneath the bead.

Obviously by the construction described a hammer blow is not applied to the bottle by the mechanism described though the closure is effected under such pressure and so quickly as to have all the advantages of a hammer blow in closing the cap, and the resiliency of the construction avoids all breakage of bottles. The tension on the springs and consequently the pressure may be adjusted by adjustment of the nut $b^2$ and the adjusting rod D. The distance of upward travel of the closing die before coming in positive bearing against the adjusting rod D is regulated by the inward or outward screwing or adjusting of said rod, and the chuck head may be adjustable against spring pressure thereby varying the action of said jaws.

Obviously details of construction and arrangement may be varied. I therefore do not purpose limiting this application for patent further than necessitated by the prior art.

I claim as my invention:

1. A sealing machine embracing a casing, a plunger therein, closing jaws movable therewith, a closing die movably a predetermined distance independently of the plunger and a chuck head shaped to actuate the closing jaws and movable with the closing jaws when the pressure becomes abnormal.

2. A sealing machine embracing a casing, an upwardly movable chuck head, a spring resisting movement thereof, a plunger movable independently of the chuck head, an independent spring resisting movement thereof, closing jaws secured to the plunger and actuated by relative movement of the chuck head and plunger, a closing die movable independently of the plunger a predetermined distance, and an independent spring resisting the independent movement of the closing die.

3. In a machine of the class described a closing die, peripherally arranged closing jaws yieldingly supported about the same and holding jaws between the closing jaws adapted to support a seal preparatory to application and said holding jaws being independent of the movement of the closing jaws in closing the seal.

4. In a device of the class described a spring pressed closing die, spring supported peripherally arranged closing jaws, below the closing die, holding jaws arranged therebetween projecting inwardly beyond the closing jaws when the closing jaws are at their lowest limit of movement adapted to support a sealing cap or the like and means adapted to yieldingly secure all of the holding jaws to engage the cap and to exert uniform tension to hold the cap in place.

5. In a device of the class described a spring pressed closing die, spring supported closing jaws arranged peripherally around and below the closing die, holding jaws between the closing jaws adapted to remain stationary when the closing jaws are elevated in sealing and a single spring acting to press all of the holding jaws inwardly to hold the cap.

6. In a machine of the class described a chuck head, a spring pressed closing die therein, peripherally arranged closing jaws below the closing die, springs engaging the same from above, holding jaws loosely supported on the chuck head positioned between the closing jaws, a spring engaged thereto and means adjusting the resistance to the movement of the die.

7. In a device of the class described a closing die, one or more springs disposed to yieldingly resist upward movement thereof, means adjustable above the closing die to limit the upward movement of the closing die and said means adapted to move with the closing die when the pressure is sufficiently great, closing jaws depending below the closing die and shaped to adjust themselves to an object engaged therebetween and a chuck head for actuating the closing jaws.

8. In a device of the class described a closing die, springs disposed to yieldingly resist upward movement thereof, closing jaws yieldingly depending around and below the closing die, a chuck head having an internal bearing surface to adjust the closing jaws to the object engaged therebetween and holding jaws positioned between the closing jaws.

9. A sealing mechanism embracing a casing, a chuck head supported thereby adapted to yield upwardly, holding jaws supported loosely on the chuck head, a plunger, closing jaws depending therefrom, and a closing die supported by and movable relatively of the plunger for a predetermined distance.

10. In a device of the class described a chuck head, a plunger movable longitudinally therein, a spring resisted closing die supported thereon, a rod adjustable in the plunger to vary the pressure of the spring exerted against upward movement of said closing die within the chuck head, spring supported closing jaws supported on the plunger and depending below the closing die, and movable therewith, and adapted to be forced inwardly below the closing die into gripping relation.

11. In a device of the class described a chuck head, a plunger movable longitudinally therein, a closing die supported thereon to permit limited movement independently of the plunger, closing jaws, springs supporting the same on the plunger to depend below the closing die, complemental faces on the jaws and the chuck head adapted by engagement to force the jaws inwardly and holding jaws supported between the closing jaws below the closing die.

12. In a device of the class described a chuck head, a plunger longitudinally movable therein, a closing die supported thereon within the chuck head adapted to move a predetermined distance independent of the plunger, a spring resisting the independent movement of the closing die, closing jaws supported on the plunger to depend below the closing die and movable therewith after a preliminary travel of the closing die and adapted by engagement within the chuck head at the upper limit of its movement to be forced inward below the closing die.

13. In a device of the class described a chuck head, an axial plunger longitudinally movable thereof, a closing die supported thereon within the plunger and the chuck head to afford preliminary travel independently of the plunger, closing jaws supported on the plunger and depending below the closing die and movable therewith after the preliminary travel thereof and adapted by engagement in its chuck head to be forced inward below the closing jaws and an adjusting rod limiting the preliminary travel of the closing die.

14. In a device of the class described a movable chuck head, yielding means for resisting movement thereof in one direction and adapted to automatically return the chuck head to normal, a spring resisted plunger movable longitudinally and axially therein, a closing die supported on the plunger and movable independently thereof for a limited distance, closing jaws supported to depend below the closing die and movable therewith for a part of its travel and adapted to be forced inwardly by engagement with the chuck head, and springs of unequal resistance arranged to oppose movement of the closing die.

15. In a device of the class described a plunger, a closing die movably supported thereon, a spring resisting inward movement of the closing die, in the plunger, an adjusting rod extending into the plunger to limit the independent travel of the closing die and to adjust the resistance to be exerted by said spring, spring supported peripheral closing jaws having outwardly directed inclined faces, an inwardly tapering chuck head acting to press said closing jaws inwardly and a compression spring to resist movement of the plunger when engaged thereby.

16. In a device of the class described the combination with a casing, a hollow plunger therein, means resisting upward movement of said plunger, a closing die depending below the plunger, means supported by the plunger engaging said closing die adapted to move a predetermined distance upwardly independent of the plunger, means resisting upward movement thereof, adjustable means for regulating the independent movement of said closing die, closing jaws movable with the plunger and extending below the closing die and means for actuating said jaws to close the seal after the preliminary movement of the closing die.

17. In a device of the class described the combination with a sleeve provided with an internal rib, a hollow plunger in the sleeve adapted to engage the rib to limit its downward movement, a spring resisting upward movement of the plunger, a closing die supported by the plunger, a spring in the bore of said plunger resisting upward movement thereof, means limiting the upward movement of the closing die independent of said plunger, closing jaws, means for operating the same and yielding means between the closing jaws and depending below the same for supporting a cap in sealing position.

18. In a device of the class described the combination with a casing, a plunger therein, means resisting upward movement thereof, a closing die adapted after a preliminary movement thereof to move the plunger, independent means resisting the preliminary movement of the closing die, adjustable means for regulating the preliminary movement of the closing die, closing jaws and means for actuating the same.

19. In a device of the class described the combination with a hollow plunger, a closing die supported by the plunger, springs resisting upward movement of said plunger and closing die, one of said springs seated in the bore of said plunger resisting movement of the closing die independently of said plunger, means extending into the bore of said plunger adapted to limit the movement of the closing die independently of the plunger, spring arms rigidly secured to the plunger, closing jaws secured thereto, means for adjusting the jaws and outwardly yielding holding jaws adapted to receive and hold a seal.

20. In a device of the class described a casing, a plunger therein having an axial bore, a spring forcing the plunger downwardly, a closing die, means secured thereto extending into the bore of the plunger supporting said die and adapting the same to move a suitable distance upwardly independently of the plunger, a spring seated in the bore of the plunger resisting said movement of the die, an adjustable rod rigidly secured to the plunger having one end projecting thereinto and limiting the independent movement of the closing die, closing jaws arranged peripherally around the closing die and extending slightly below the same, apertured holding jaws and a spring extending through said apertures yieldingly forcing the said holding jaws inwardly.

21. A sealing machine embracing a casing, an upwardly movable chuck head, a spring resisting movement thereof, a plunger movable independently of the chuck head, an independent spring resisting movement thereof, closing jaws secured to the plunger and actuated by relative movement of the chuck head and plunger, a closing die movable independently of the plunger a predetermined distance, an independent spring resisting the independent movement of the closing die, and an adjustable member for regulating the movement of the closing die independent of the plunger.

22. In a device of the class described closing jaws, a closing die adapted to move for a distance independently of the closing jaws and then movable with the closing jaws, a chuck head adapted to actuate the closing jaws and normally immovable but adapted to yield with the closing die and closing jaws when pressure is excessive.

23. In a device of the class described a closing die resisted in its upward movement, closing jaws arranged to close beneath the same, a chuck head formed to actuate the closing jaws, a spring adapted to permit the same to yield upwardly when the pressure exerted in sealing exceeds a certain limit and outwardly yielding holding jaws adapted to hold a cap in position to fit a bottle.

24. In a device of the class described a closing die, closing jaws arranged concentric therewith and adapted to close below the same, a movable chuck head adapted to actuate the closing jaws, means normally resisting movement thereof but adapted to permit the chuck head to yield to prevent sufficient pressure being exerted in sealing the bottle to break the same and holding jaws adapted to support a cap.

25. In a device of the class described a closing die, closing jaws arranged concentric therewith and adapted to close below the same, a movable chuck head adapted to actuate the closing jaws, means normally resisting movement thereof but adapted to permit the chuck head to yield to prevent sufficient pressure being exerted in sealing the bottle to break the same, holding jaws adapted to support a cap, a spring engaging the holding jaws permitting the same to yield outwardly and a centering guide rigidly secured to the chuck head.

26. In a device of the class described closing jaws, a closing die adapted to move for a distance independently of the closing jaw and then movable with the closing jaws, a chuck head adapted to actuate the closing jaws and normally immovable but adapted to yield with the closing die and closing jaws when pressure is excessive, and an independent pushing spring for resisting the movement of the closing die, the closing jaws and the chuck head.

In testimony whereof I have hereunto subscribed my name in the presence of two subscribing witnesses.

JACOB HERMANN.

Witnesses:
C. W. HIRES,
H. SCARBOROUGH.